United States Patent Office 3,551,189
Patented Dec. 29, 1970

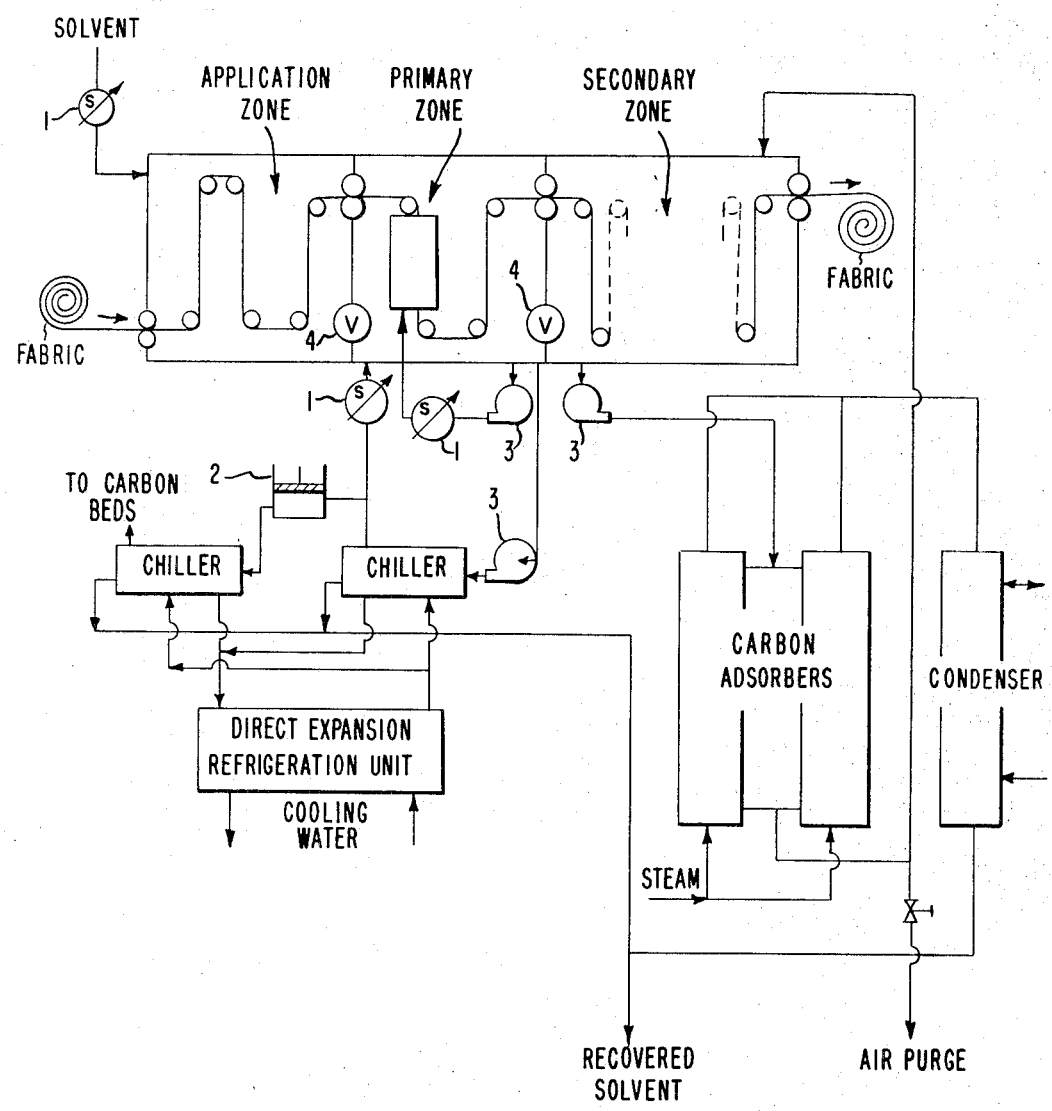

3,551,189
SOLVENT RECOVERY PROCESS AND APPARATUS
Charles L. Gray, Jr., and Robert B. Ramsey, Jr., Wilmington, Del., assignors to E. I. du Pont de Nemours and Company, Wilmington, Del., a corporation of Delaware
Continuation of application Ser. No. 425,838, Jan. 15, 1965. This application Oct. 23, 1968, Ser. No. 777,962
Int. Cl. B01d *53/14, 5/00*
U.S. Cl. 117—102                    11 Claims

ABSTRACT OF THE DISCLOSURE

Continuous process for recovering a volatile solvent from a substrate by passing the substrate in series through an enclosed, heated primary solvent recovery zone from which solvent is recovered by a refrigeration recovery system, and an enclosed secondary solvent recovery zone from which solvent is recovered by a sorption recovery system. The substrate is passed to the primary recovery zone from a previous solvent degreasing operation, or directly from an enclosed application zone in which a material is applied to the substrate from a solvent-carried composition.

CROSS-REFERENCE TO RELATED APPLICATIONS

This application is a continuation of U.S. Ser. No. 425,838, filed Jan. 15, 1965, now abandoned.

Use of solvents in the processing of textiles and films is increasing. Hitherto, most solvent treatment has been in the field of drycleaning. Now, other applications, such as, for example, dyeing, oil or water proofing, sizing and crease proofing in the presence of solvents are assuming greater importance in the trade. The major drawback to commercialization of these applications is the loss of solvent, thereby increasing the cost of such operations. To overcome this disadvantage, some applications have been conveniently combined with the drycleaning process, as described, for example, in U.S. Pat. 2,933,411. In drycleaning machines, solvent is recovered by carbon adsorption, as described in U.S. Pat. 2,910,137; by condensation of the vapors, as described in U.S. Pat. 3,070,463; or by a combination of condensation and carbon adsorption, as described in U.S. Pat. 3,104,936.

Drycleaning systems are concerned with removing solvent at the end of each cleaning operation from a single compartment containing the textile.

In solvent processes being developed today, large quantities of materials are involved. In order for such processes to be practical, the material must be moved continuously and rapidly from the application stage to the finishing stage. Unlike the drycleaning process, this means that solvent removal must take place efficiently while fresh solvent is being introduced to the system. This results in additional loss of solvent which does not exist in drycleaning, namely the solvent which is carried along with the material, either evaporating into the atmosphere thereby contaminating the air, and/or contaminating a further finishing step, not to mention added cost due to lost solvent.

Prior to the present invention, in the degreasing of textiles, for example, cloth is passed through a series of bowls containing trichloroethylene, the latter being passed from bowl to bowl counter to the cloth movement. Following this, the cloth is passed over hot dry cans where the solvent is evaporated and recovered by a condensing system. The fabric is then passed from this drying area through a seal to the outside.

The recovery of solvent from a fabric leaving a chamber saturated with solvent vapor poses a limitation on the practical removal of solvent from the fabric. Furthermore, solvent recovery efficiency by condensation is limited by the solvent humidity at the temperature of the condensing coils. For example, the saturation of trichlorotrifluoroethane at 62° F. is about three pounds of solvent per pound of dry air. If a cold water cooler provides 62° F. at the condenser, this is the limit of solvent removal by this particular process.

It is, therefore, an object of the present invention to provide a unique continuous solvent process, in a closed system, which process may be conducted rapidly and achieve an efficient recovery of the solvent utilized.

These and other objects will be apparent in the specification and claims which follow.

More specifically, the present invention is directed to a continuous solvent process for applying materials to substrates in which process said substrate is passed through a closed system consisting essentially of and in series (1) an application zone, (2) a heated primary solvent refrigeration/compression recovery zone and (3) an air scrubbing secondary solvent sorption recovery zone, said substrate then being recovered after passing through said closed system.

A preferred embodiment includes the heretofore described process wherein pressure control valve means are utilized to maintain appropriate pressures in each of said zones. For example, negative pressures may be desired in the application and primary zones but not in the secondary zone.

The accompanying drawing sets forth a representative means for carrying out the process of this invention. In this drawing, the fabric, or other material, is initially fed into the application zone wherein it is contacted with a desired solvent-carried composition, said zone being maintained at an appropriate temperature and pressure; the fabric then passes into the primary zone through nip rolls; in this zone, the bulk of the solvent utilized is recovered by the indicated refrigeration and compression units, an appropriate temperature and pressure being maintained; from this primary zone, the fabric is then passed through nip rolls into and through a secondary zone wherein said fabric is air scrubbed, residual solvent being recovered by the indicated carbon adsorption units, an appropriate temperature and pressure being maintained.

As will be observed in the accompanying drawing, the chiller and carbon adsorber recovered solvent is cycled for reuse. The solvent/steam mixture resulting from regeneration of the carbon adsorbers is passed to a separator, this solvent also being recovered for reuse.

In this system as set forth in the drawing, the steam heater units 1, the compressors 2, the centrifugal blowers 3 and the pressure control valves 4 are readily available in the trade and may be varied by separate controls to perform the same or differently depending, for example, on the degree of heat or amount of pressure desired. The chiller units and carbon adsorbers are also commercially available.

A novel process of technical significance has now been discovered which utilizes a means of vaporization and condensation followed by air scrubbing and adsorption to effect substantially complete removal of solvent from the material being treated. Vaporization and condensation alone are not completely effective. Air scrubbing with adsorption of solvent vapors alone requires unpractically large adsorbers. Furthermore, being at the last stage, they effectively remove lower amounts of solvent, whereas if used along, they would not accomplish total removal of solvent. The combination of both principles in proper sequence and under proper conditions results in the advantage of reducing size of equipment and improvement in efficiency. One direct and unexpected result achieved by the herein described and claimed process is that a solvent system is now provided which can be operated rapidly as in the known water systems.

A representative example illustrating the present invention as utilized to apply a water and oil repellent composition to a fabric substrate follows.

EXAMPLE

This representative process example discloses the application of a water and oil repellent onto a fabric and follows:

A pad bath of repellent solution is prepared as follows: 13.3% by weight of a concentrate comprising 7.5% by weight of a fluorocopolymer, 16% tetrachlorodifluoroethane, and 76.5% trichlorotrifluoroethane is prepared in trichlorotrifluoroethane. The fluorocopolymer consists of 8 pts./wt. of 1–H, 1–H, 2–H, 2–H, perfluoro-$C_6$–$C_{14}$ alkyl methacrylates, 2 pts./wt. of butyl methacrylate and 0.5 pt. of glycidyl methacrylate.

The solution thus prepared in an enclosed tank is piped into a two bowl padder tank that is confined in Zone 1. Fabric entering Zone 1 goes through the padder, over rolls to provide sufficient penetration into the fabric and then into Zone 2. A high solvent vapor humidity in Zone 1 prevents premature evaporation of more volatile solvents.

The fabric entering Zone 2 passes through heated vapor jet dryers where all of the liquid solvent is vaporized. The vapors thus generated are hot and are chiller cooled to 40° F. by a refrigeration unit. The vapors are condensed to liquid and the liquid solvent is recovered. The uncondensed vapors are reheated and returned to the second zone. A bleed from this return duct prior to reheating goes through a compression and into a second chiller where further vapor condensation occurs and the solvent thus liberated is recovered for reuse. The residual vapors pass into the carbon absorbers to remove the final solvents in this bleeder vapor stream. This bleeder system provides a negative pressure within the unit to minimize solvent losses through leaks and drag-out effects.

The fabric then goes to Zone 3 where air is passed through the fabric to remove residual solvent vapors. This air is passed through a carbon adsorber where the solvent is adsorbed and the purged air is returned to the third zone. Two suitable controlled carbon adsorbers are used, so one can adsorb solvent while the other is regenerated with steam, the steam is condensed and the solvent is separated from the water for reuse in a water separator.

At start-up of the machine, it is necessary to purge the air in the system through the condensers and then through the adsorbers until the vapor concentration increases to the equilibrium points.

Many solvents may be utilized in practicing the invention process and include hydrocarbons such as n-pentane, n-hexane, n-heptane and toluene. These require special safety precautions to prevent fire and explosion. Also included are chlorinated solvents like trichloroethylene, tetrachlorethylene and methylene chloride and fluorocarbons like trichlorofluoromethane and trichlorotrifluoroethanes. Azeotropic blends of solvents are also possible such as a trichlorotrifluoro ethane/methylene chloride azeotropic blend.

The present process utilizes a number of substrates such as web structures and textiles. Sizes may be applied to warp sizes by this method, preferably on beams to form an enclosed solvent slasher operation.

Woven fabrics may be dyed, finished or modified for further processing. For example, they may be coated with antistatic compositions to provide easier fabric manipulation. Also, paper may be dyed, coated or modified with resins to provide improved wet strength.

Films like polyvinylidene chloride cellophane or aluminum foil may be processed. They can be colored, coated or modified with such things as repellents, moisture barriers and the like.

Plastic webs such as foam backed webs can be colored or coated.

Among many materials that can be applied by this process are dyes, pigments, resin coatings and modifiers, water repellents, sizes, softeners, and antistatic agents. The use of this solvent process would permit the efficient use of solvents to replace water, thereby permitting the of compositions reactive with cellulosic hydroxy groups which would be decomposed by water as a processing medium.

In the process of the present invention, a solvent system is utilized as a medium for applying materials to substrates. The first zone is enclosed to provide a high solvent vapor concentration which will prevent premature evaporation of solvent. It also will prevent waste by loss to the atmosphere.

The second zone (condensing recovery) is needed to vaporize the solvent and concentrate these vapors with minimum air and moisture contamination for recovery by a condenser system. The condenser is needed to recover the bulk of the solvent used in Zone 1. The condenser is limited however in its capacity to remove solvent by the solvent vapor capacity of air at the temperatures of the chiller condensing coils. This is the maximum amount of solvent that can be recovered by the condenser. Condenser coils should generally not approach 32° F. in order to prevent freezing of moisture carried into the zone by the substrate and possible leaks. The condenser solvent recovery efficiency is greatly affected by moisture and air contamination and these should be kept to a minimum.

The third zone is required to overcome the deficiency of the second zone, i.e., incomplete solvent recovery due to inherent limitations. The third zone uses recirculated hot air to remove residual solvent from the substrate. It, in effect, replaces air for the remaining solvent vapors. The air and solvent vapors together are passed through a carbon adsorber system (comprising two or more adsorber units if continual production is desired) to remove the vapors for recovery.

In summary, condensing plus sorption methods are required for maximum efficiency when large amounts of solvents must be recovered as in a high speed commercial substrate processing plant. Condensers with their inherent limitations permit excessive solvent losses. Carbon adsorbers can handle the load, but their size and the utilities required for such large loads makes for less efficient use of such utilities and floor space and equipment.

In place of the herein disclosed carbon adsorbers, an oil absorption system can be utilized wherein the solvent vapors in air are brought into contact with an oil cascade. The cascade may comprise, for example, a film or a spray of oil droplets to provide a large contact area. The solvent dissolves into the oil phase and is collected and passed to a heating zone. In this zone, the solvent vaporizes and is collected by subsequent cooling and condensation. The hot oil is then cooled and recycled back into the cascade zone. A representative oil which may be utilized is diisooctyl adipate.

The preceding representative examples may be varied within the scope of the present total specification disclosure, as understood and practiced by one skilled in the art, to achieve essentially the same results.

The process of the invention in which an exclusive property or privilege is claimed is defined as follows:

1. A continuous process for substantially complete recovery of volatile solvent from a solvent-saturated substrate which comprises passing the substrate through an enclosed primary solvent recovery zone which is maintained at a negative pressure, heating the substrate in the primary recovery zone thereby vaporizing all of the solvent, withdrawing concentrated solvent vapor from the primary recovery zone and recovering solvent therefrom by condensing the vapor in a refrigeration recovery system operating at a temperature above 32° F., recycling uncondensed solvent vapor from the refrigeration recovery system to the primary solvent recovery zone, passing the substrate directly from the primary solvent recovery zone into an enclosed secondary solvent recovery zone, air scrubbing the substrate in the secondary recovery zone thereby removing residual solvent vapor, withdrawing an air-solvent vapor mixture from the secondary recovery zone and recovering solvent therefrom in a sorption recovery system, recycling air from the sorption recovery system to the secondary recovery zone, and withdrawing the substrate substantially free of solvent from the secondary recovery zone.

2. The process of claim 1 in which the refrigeration recovery system includes a compression step.

3. The process of claim 2 in which the substrate is passed to the primary solvent recovery zone from a solvent degreasing step.

4. The process of claim 2 in which the substrate is passed to the primary solvent recovery zone directly from an enclosed application zone where a material is applied by a solvent-carried composition.

5. The process of claim 4 in which the application zone has a high solvent vapor concentration and is at a negative pressure.

6. The process of claim 4 in which the sorption recovery system is a carbon adsorption system.

7. The process of claim 4 in which the sorption recovery system is an oil absorption system.

8. Apparatus which comprises an enclosed primary recovery zone, means for continuously passing a substrate into the primary recovery zone, means for applying heat to the substrate in the primary recovery zone, means for providing a negative pressure in the primary recovery zone while removing solvent vapor, means for condensing said solvent vapor by refrigeration, means for returning uncondensed solvent vapor to the primary recovery zone, means for continuously passing the substrate directly from the primary recovery zone to an enclosed secondary recovery zone, means for removing solvent vapor from the secondary recovery zone, means for recovering liquid from said solvent vapor by sorption, means for returning residual solvent vapor to the secondary recovery zone, and means for continuously removing substrate from the secondary recovery zone.

9. The apparatus of claim 8 in which the means for condensing vapor includes compression means.

10. The apparatus of claim 9 in which the means for recovering liquid by sorption is carbon adsorption.

11. The apparatus of claim 9 in which the means for recovering liquid by sorption is oil absorption.

References Cited

UNITED STATES PATENTS

| | | | |
|---|---|---|---|
| 1,595,489 | 8/1926 | Minton | 118—50X |
| 1,596,671 | 8/1926 | Lionne | 118—61X |
| 1,843,657 | 2/1932 | Welles et al. | 68—18 |
| 2,176,705 | 10/1939 | Derby | 8—139.1 |
| 2,910,137 | 10/1959 | Victor | 68—18X |

RALPH S. KENDALL, Primary Examiner

U.S. Cl. X.R.

8—141; 68—18; 117—119; 118—61